J. L. R. HAYDEN.
CHEMICAL REACTION BY MEANS OF AN ELECTRIC ARC.
APPLICATION FILED MAY 8, 1908.
1,066,272.
Patented July 1, 1913.
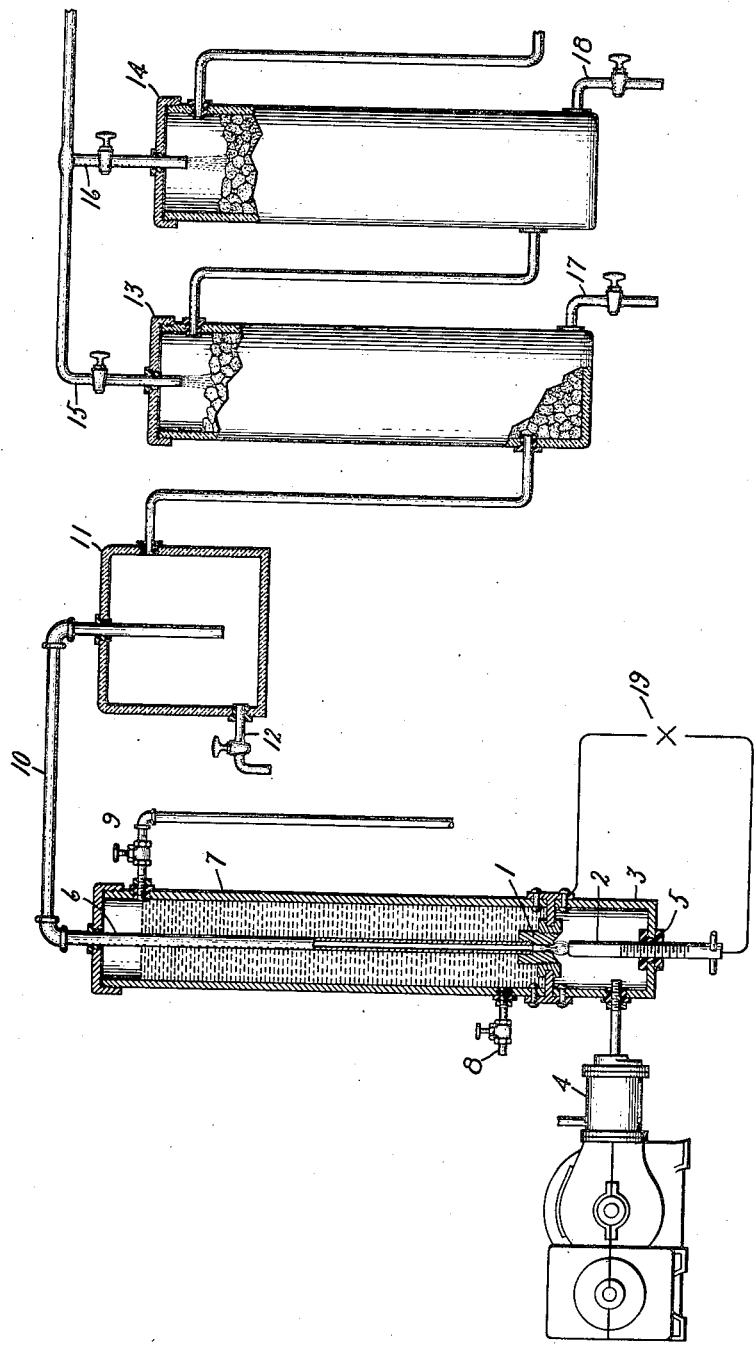
Witnesses:
George W. Tilden
J. Ellis Glen
Inventor:
Joseph L.R. Hayden,
by Albert G. Davis
Att'y.

UNITED STATES PATENT OFFICE.

JOSEPH L. R. HAYDEN, OF SCHENECTADY, NEW YORK, ASSIGNOR TO GENERAL ELECTRIC COMPANY, A CORPORATION OF NEW YORK.

CHEMICAL REACTION BY MEANS OF AN ELECTRIC ARC.

1,066,272.  Specification of Letters Patent.  Patented July 1, 1913.

Application filed May 8, 1908. Serial No. 431,599.

*To all whom it may concern:*

Be it known that I, JOSEPH L. R. HAYDEN, a citizen of the United States, residing at Schenectady, in the county of Schenectady, State of New York, have invented certain new and useful Improvements in Chemical Reactions by Means of Electric Arcs, of which the following is a specification.

My invention relates to the production of chemical interaction in a mixture of substances by means of an electric arc.

It has been observed that certain compounds and elements, which are inert with respect to one another under ordinary conditions, can be made to interact with a formation of new compounds when subjected to the influence of an electric arc. This is prominently the case with the elements oxygen and nitrogen, which appear as mixture in atmospheric air, and which when passed through an electric arc combine with one another to form nitric oxid according to the reaction $N+O=NO$. It is likewise true that the nitric oxid formed by this reaction is dissociated at a high temperature. If, however, the nitric oxid is cooled very rapidly to a temperature below its dissociation temperature (500° to 600° C.) the decomposition of nitric oxid into nitrogen and oxygen is almost entirely prevented. Therefore, a process for producing nitric oxid by means of the electric arc must provide for a rapid cooling of the nitric oxid produced, in order to be efficient.

Various kinds of electric discharges have been used for this purpose. Long, thin, intermittent arcs have been used, but these, for various reasons, have proved to be impracticable, particularly because with such arcs the consumption and utilization of energy per unit of plant is not sufficiently great to make the process commercial. In order to obtain greater energy consumption, high potential arcs of higher current have been used for the same purpose, but these, for reasons which will be pointed out farther on, involve a waste of energy.

In order to rapidly cool the gases after having been acted upon, the arcs have either been moved with relation to the gaseous mixture, or the gases have been moved with relation to the arc; but when the arc is moved through the gases a sufficient rate of cooling to prevent a partial dissociation of the products of the reaction cannot be attained, and there is, therefore, an attendant loss. In the second place, a long flared-out arc is necessary, and such an arc requires high voltage. When the gases are blown across the arc stream, the velocity of the gases leaving the arc, and, therefore, the rate of cooling, is again limited, as a high velocity cannot be attained without blowing out the arc. Furthermore, the arc is greatly lengthened by being blown aside, and, consequently, here again the arc voltage rises. In either case, arcs of high potential had to be used; but I have found that the quantity of nitric oxid produced depends on the current consumed in the arc rather than on the voltage of the arc, consequently the use of high voltage involves an energy consumption without a corresponding increase of yield, and this waste of energy is avoided by my invention, one of the features of which is the employment of a low-voltage arc.

In order to obtain the advantage of a short low-voltage arc and a high velocity of gas stream, which will make rapid cooling possible, I remove the gas in a direction parallel with the arc stream. With this arrangement it then becomes necessary to blow or suck the gases axially into one of the electrodes, avoiding a movement of the gases transversely to the arc, which would blow the arc off the edge of the electrode. By using this arrangement, instead of requiring arc voltages of a thousand volts or more, I can use a potential of only 50 to 150 volts. As I employ arcs of high-current consumption I get a large energy consumption and high output per unit of plant.

The electrode into which the arc is drawn must have a proper shape to give steadiness to the arc, and to insure that all the gases which have passed through the arc are collected and that all the gases to be acted upon must pass through the arc before being collected. This is done by making the electrode cup-shaped, or funnel-shaped, with a perforation, or restricted duct, in the center of the funnel. The gaseous mixture then must all pass parallel through the arc and passes with the arc into this perforation, where it is rapidly, if not instantaneously, cooled to a temperature below its dissociation temperature, namely, 500°–600° C.

While the novel features of my invention are pointed out in the appended claims, a better understanding of the means of successfully carrying out the same may be obtained from the following description taken in connection with the accompanying drawing.

The drawing shows in a somewhat diagrammatic way the arrangement of electrodes with suitable means for cooling the products of the reaction, together with such accessory apparatus as is necessary for absorbing the products of the reaction which takes place in the arc. The arc is formed between the perforated electrode 1, and the electrode 2, which in the drawing is shown as movable. The arc is surrounded by a pressure chamber 3 which communicates with a blower 4. The electrode 2 is insulated from the pressure chamber by means of a suitable bushing 5. The perforated electrode communicates with a narrow metallic tube 6, which is surrounded by a water jacket 7, which is provided with an intake pipe 8 and overflow pipe 9. The water serves to cool not only the tube 6, but the electrode 1 which is made of some good heat conducting material. The electrode 2 may be cooled by the blast from the blower 4, as shown in the drawing, or it may be cooled in any well-known way, as by a circulation of water through the same. The tube 6 is connected through connecting-pipe 10 to a reaction chamber 11. As in the case of certain reactions for which the arc may be used liquid products may be formed in the chamber 11, it is provided with a tap 12 in order to draw off any liquid product which may form under certain conditions in this chamber. The reaction chamber communicates with absorbing chambers 13 and 14 through suitable connecting pipes. These chambers are formed of some suitable material, such as stone-ware, so as not to be attacked by the acid. They are filled either with some vitreous material which is not attacked by acids, or with some material such as broken lime-stone or chalk, which may combine with the nitric acid formed in these chambers. A film of moisture is maintained on the broken material in these chambers by water trickling over the same from the supply pipes 15 and 16. The acid collected in these chambers may be tapped off through the pipes 17 and 18. It will be understood that other absorbing chambers, if necessary, in order to absorb all the product of reaction, may be added and connected in a similar manner, or, some absorbing towers may be supplied with water only and some with lime-stone or other material as well.

The electrodes 1 and 2 are connected to some suitable source of current, such as a generator or a constant-current rectifier 19. The electrodes are shown in the drawings as supplied with a direct current, but an alternating current may also be used. I prefer to use a direct current, as this has the advantage of maintaining a steadier arc at a low voltage, and, therefore, is preferable. I prefer to make the upper electrode the anode and the lower electrode the cathode, passing the reaction mixture through the arc in the direction of the arc blast. The anode may conveniently be made of copper, and the cathode of iron. I find that the cathode wears away exceedingly slowly, the cathode not needing any regulation for intervals of 10 to 12 hours.

Having now described my apparatus, I will proceed to describe its method of operation. In the first place, an arc is produced between the electrodes 1 and 2, for instance, by bringing them in contact and separating them, and this arc is then regulated so as to make it as short as possible and still maintain the arc steady. A flow of water is started through the water jacket. The mixture to be acted upon, such as a mixture of nitrogen and oxygen, is then introduced into the chamber 3 by means of the blower at a sufficient pressure to produce a high velocity air current through the copper tube 6. The gases pass through the short arc, are there partly converted into nitric oxid and the gas mixture is then carried at high velocity from the arc through the perforation of the electrode and into the narrow metallic tube 6. They are cooled below the critical temperature with great rapidity. As explained above, this rapid cooling prevents loss by dissociation from taking place to any appreciable extent.

As already explained, the anode is best made cup-shaped, so as to pass all the gases through the arc, allow none of them to escape, and at the same time maintain a steady arc. The gaseous mixture, which now consists of nitric oxids and uncombined nitrogen and oxygen, passes into the reaction chamber 11, where the reaction completes itself; that is, the still uncombined nitric oxid combines with the free oxygen to form nitrogen peroxid. The mixture of the oxids of nitrogen now passes on into the absorption chambers, where it combines with the water to form nitrous and nitric acids. In case the absorption chambers are filled with a material as limestone, of course, calcium nitrite and nitrate are produced. In a manner well-known in the art the nitrous and nitric acids, or the nitrites and nitrates, as the case may be, are separated from each other and, if desired, the nitrous acid is converted into nitric acid, or the nitrite to a nitrate. Of course, instead of introducing the gaseous mixture under pressure in the chamber 3, the movement of gases through the arc may be caused to take place by suction applied through the exit pipe issuing from the last absorbing tower, although I find the method first described, that is, applying the pressure, is a more convenient one. Instead of a single arc, a battery of arcs may be used, all communicating with the reaction chamber, and from this to the absorbing chambers. The capacity of each unit may also be increased by increasing the current per arc, and as the arc is best maintained at low voltage and high current this can be readily done. As the voltage decreases with an increase of current this improves the efficiency and output.

While I have described the operation of my apparatus as applied more particularly to the combination of nitrogen and oxygen for the production of nitric acid, it is obvious that the process may also be used for the combination of different elements and compounds with each other or for other chemical reaction. For example, as described and claimed in an application by Chas. P. Steinmetz, Serial No. 543,254, filed February 11, 1910, by using a mixture of air and steam, ammonia and ammonium nitrate can be produced; by using one carbon electrode and using a mixture of steam and nitrogen cyanogen and cyanides can be produced. In the same manner numerous other compounds which form in the arc, but are unstable at high temperatures, can be produced by the same method. Also other chemical reactions which are produced by the arc, but reversed by high temperatures, can be efficiently performed.

What I claim as new and desire to secure by Letters Patent of the United States, is:

1. The process of producing a chemical change in a mixture of substances, at least one of which is a vapor, by means of an electric arc, which consists in bringing said substances into the electric arc and removing all the products of the resulting reaction from the arc in a direction parallel with the arc stream and rapidly cooling the products below the temperature at which the reaction can reverse.

2. The process of producing a chemical change in a mixture of substances at least one of which is a gas by means of a low-voltage arc, which consists in bringing said substances into the arc and removing the products of the resulting reaction in a direction parallel with the arc stream and rapidly cooling the products below the temperature at which the reaction can reverse.

3. The process of producing a chemical change in a mixture of substances at least one of which is a gas by means of a low-voltage, direct-current arc, which consists in bringing said substances into the arc and removing the products of the resulting reaction in a direction parallel with the arc stream and rapidly cooling the products below the temperature at which the reaction can reverse.

4. The process of producing a chemical reaction in a gaseous mixture, which consists in passing said mixture through a short electric arc and removing the gases acted upon by the arc in a direction parallel with the arc stream and rapidly cooling said mixture below the temperature at which the reaction can reverse.

5. The process of producing a chemical reaction in a gaseous mixture, which consists in passing said mixture through a low-voltage arc and removing the products of the reaction in a direction parallel with the arc and rapidly cooling said mixture below the temperature at which the reaction can reverse.

6. The process of producing a chemical reaction in a gaseous mixture, which consists in passing said mixture through a direct-current low-voltage arc in the direction of the arc stream and cooling the resulting mixture.

7. The process of producing a chemical reaction in a gaseous mixture, which consists in passing said mixture through a low-voltage arc and withdrawing the products in the direction of the arc stream and cooling the resulting compound.

8. The process of producing a chemical reaction in a gaseous mixture, which consists in passing said mixture through a low-voltage, high-current arc, and cooling the resulting compound below the temperature at which the reaction can reverse.

9. The process of producing a chemical reaction in a gaseous mixture, which consists in passing said mixture at high velocity through a low-voltage, high-current arc of short length and rapidly cooling the product below the temperature at which the reaction can reverse.

10. The combination of a perforated cup-shaped or funnel-shaped electrode, a coöperating electrode, means for producing a low-voltage arc between said electrodes, means for urging a gaseous mixture through the arc and into the hollow electrode, and means for cooling the resulting gaseous mixture.

11. The combination of a perforated cup-shaped, positive electrode, a coöperating negative electrode, means for producing an electric arc between said electrodes, and means for urging gases through said arc and into said cup-shaped electrode.

12. A transformer or conveyer, comprising lower and upper chambers in communication with each other by means of a restricted duct, the lower chamber being provided with means for introducing a mixture and arcing electrical conductors, and the upper chamber with a supply and discharge duct, and a cooling or refrigerating means.

13. In an apparatus for producing reactions between gases electrically, the combination of two chambers communicating with each other by means of a restricted duct, means for urging the gases to be acted upon from one chamber to the other through said duct, and means for striking a short low voltage arc at the duct aperture of the chamber discharging said gases.

In witness whereof, I have hereunto set my hand this 7th day of May, 1908.

JOSEPH L. R. HAYDEN.

Witnesses:
 BENJAMIN B. HULL,
 HELEN ORFORD.